United States Patent
Caba et al.

(10) Patent No.: US 11,453,131 B2
(45) Date of Patent: Sep. 27, 2022

(54) METHOD AND APPARATUS FOR REMOTE NATIVE AUTOMATION DECOUPLING

(71) Applicant: UiPath, Inc., New York, NY (US)

(72) Inventors: Alexandru Caba, Bucharest (RO); Marius Stan, Bucharest (RO)

(73) Assignee: UIPATH, INC., New York, NY (US)

( * ) Notice: Subject to any disclaimer, the term of this patent is extended or adjusted under 35 U.S.C. 154(b) by 389 days.

(21) Appl. No.: 16/730,524

(22) Filed: Dec. 30, 2019

(65) Prior Publication Data

US 2021/0197395 A1 Jul. 1, 2021

(51) Int. Cl.
*G06F 9/46* (2006.01)
*B25J 13/00* (2006.01)
*G06F 9/50* (2006.01)

(52) U.S. Cl.
CPC .......... *B25J 13/006* (2013.01); *G06F 9/5055* (2013.01)

(58) Field of Classification Search
CPC .................................................. G06F 9/5055
See application file for complete search history.

(56) References Cited

U.S. PATENT DOCUMENTS

| | | | |
|---|---|---|---|
| 8,099,502 B2 | 1/2012 | Genske et al. | |
| 10,095,537 B1* | 10/2018 | Neogy | G06F 9/45558 |
| 2010/0325644 A1 | 12/2010 | Van Der Linden et al. | |
| 2011/0145814 A1 | 6/2011 | Mangione-Smith | |
| 2013/0339953 A1 | 12/2013 | Wibling et al. | |
| 2016/0011886 A1 | 1/2016 | McGovern et al. | |
| 2017/0001308 A1* | 1/2017 | Bataller | G06F 3/0484 |
| 2019/0324781 A1 | 10/2019 | Ramamurthy et al. | |

FOREIGN PATENT DOCUMENTS

| | | |
|---|---|---|
| KR | 1020110115889 A | 10/2011 |
| WO | 2015062217 A1 | 5/2015 |
| WO | 2018166750 A1 | 9/2018 |

OTHER PUBLICATIONS

CONTEXTOR available at https://contextor.eu/en/products/interactive-engine/ last visited Dec. 30, 2019.

* cited by examiner

Primary Examiner — Gregory A Kessler
(74) Attorney, Agent, or Firm — Volpe Koenig (57) ABSTRACT

A computing device for compatibility in robotic process automation (RPA) includes a memory that includes a plurality of RPA tool driver versions, and a processor communicatively coupled with the memory. Upon the processor receiving a request for a first RPA tool driver version of the plurality of RPA tool driver versions, the processor loads the first RPA tool version for processing.

15 Claims, 5 Drawing Sheets

METHOD AND APPARATUS FOR REMOTE NATIVE AUTOMATION DECOUPLING

BACKGROUND

When automating applications in a virtual machine (VM) environment, the detection of user interface (UI) elements is difficult as the VM applications are presented in the form of images. There is a need for a tool to provide native automation capability to user interfaces of VM applications. A version upgrade of automation tools creates compatibility issues during run time of the VM automation.

SUMMARY

The present application is directed to making different versions of robotic process automation (RPA) tool to be backward compatible with the VM applications to be automated. Decoupling of the drivers installed is performed for automation of VM application and the appropriate version of the driver is loaded for performing a particular automation request.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Although a more detailed description is provided below, briefly UiPath allows native automation by installing an extension on a client machine and the remote runtime component on the application servers. This allows UIAutomation activities, such as Click, Type Into, Get Text, Extract Data, and more based on selectors. UiPath uses messaging over an independent computing architecture (ICA) or remote desktop services (RDP) channel for more reliability and performance. However, compatibility of different versions of the robotic process automation (RPA) tool with virtualized applications is utilized, as described below.

For the methods and processes described herein, the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly to longer lists with the same explained logic.

Figure 1A:
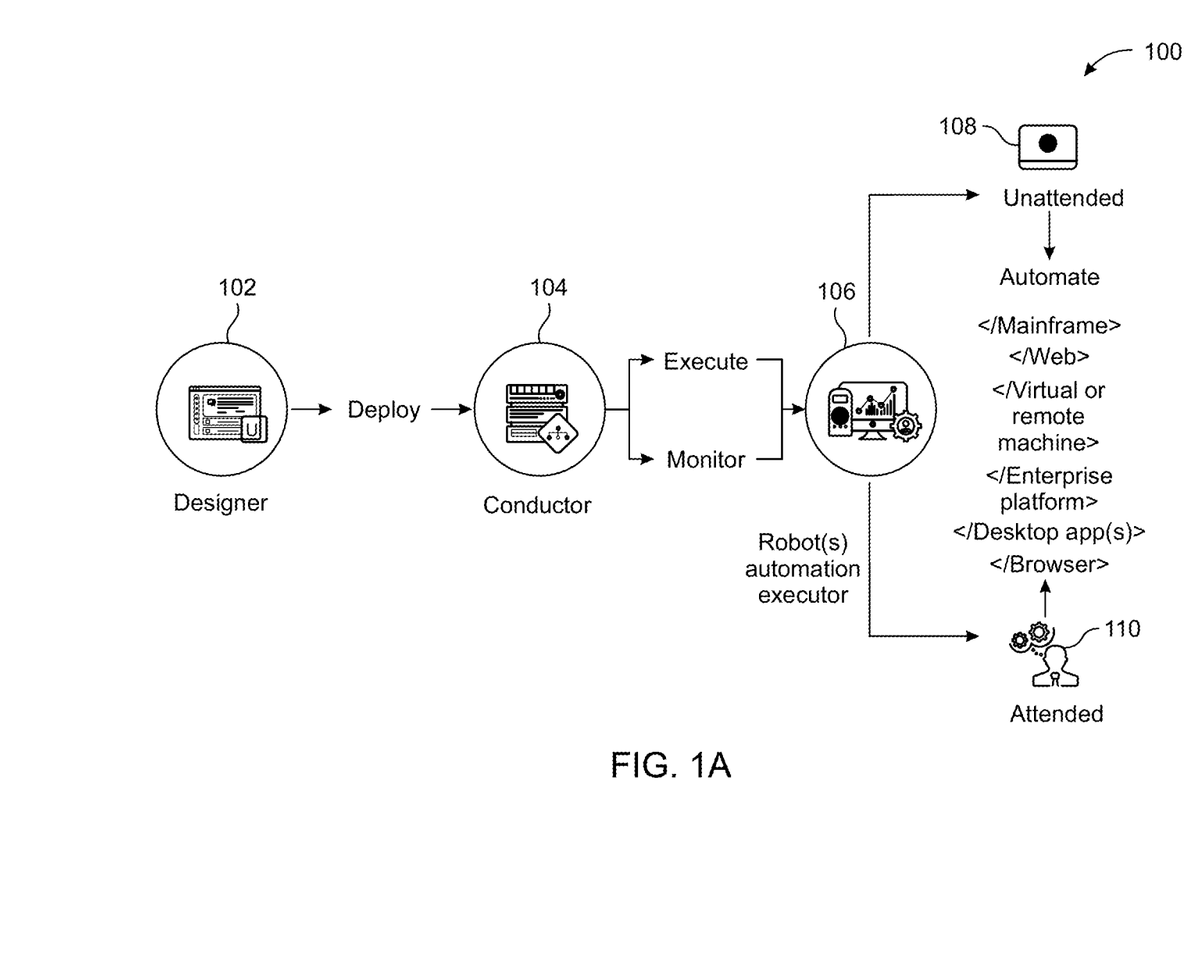
FIG. 1A is an illustration of robotic process automation (RPA) development, design, operation, or execution.

FIG. 1A is an illustration of robotic process automation (RPA) development, design, operation, or execution 100. Designer 102, sometimes referenced as a studio, development platform, development environment, or the like may be configured to generate code, instructions, commands, or the like for a robot to perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation to a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language ((HTML), HTML5, extensible markup language (XML), JavaScript, C#, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component. Unattended 108 or attended 110 robots may run or execute on mobile computing or mobile device environments.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
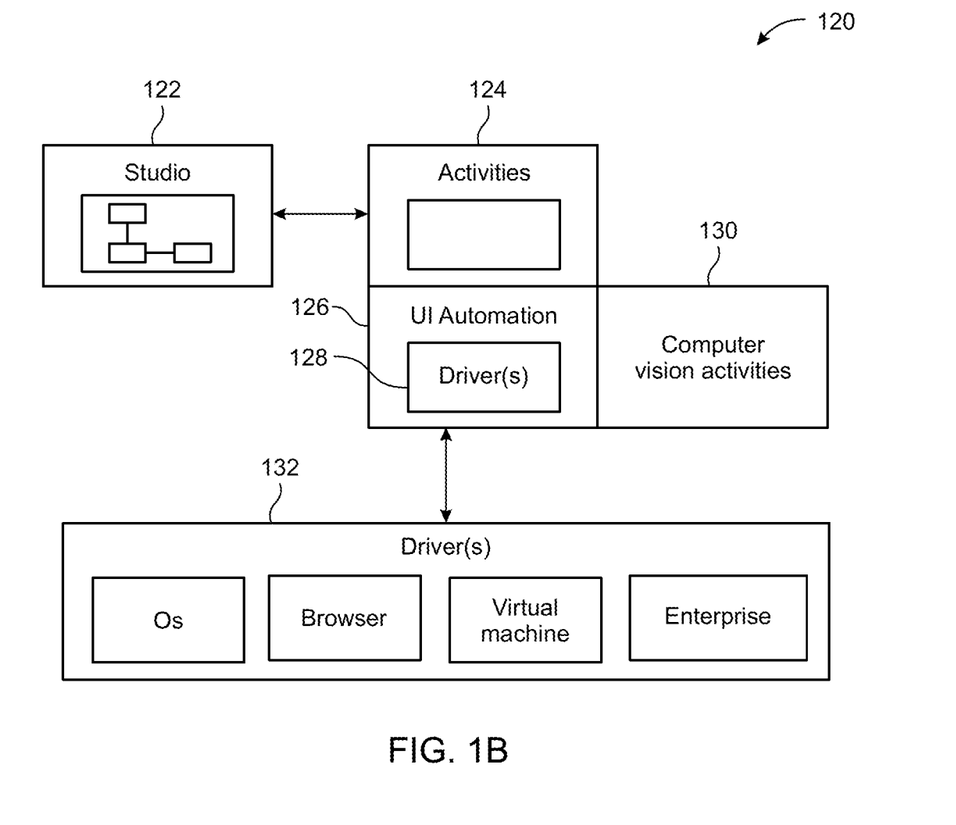
FIG. 1B is another illustration of RPA development, design, operation, or execution.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

Figure 1C:
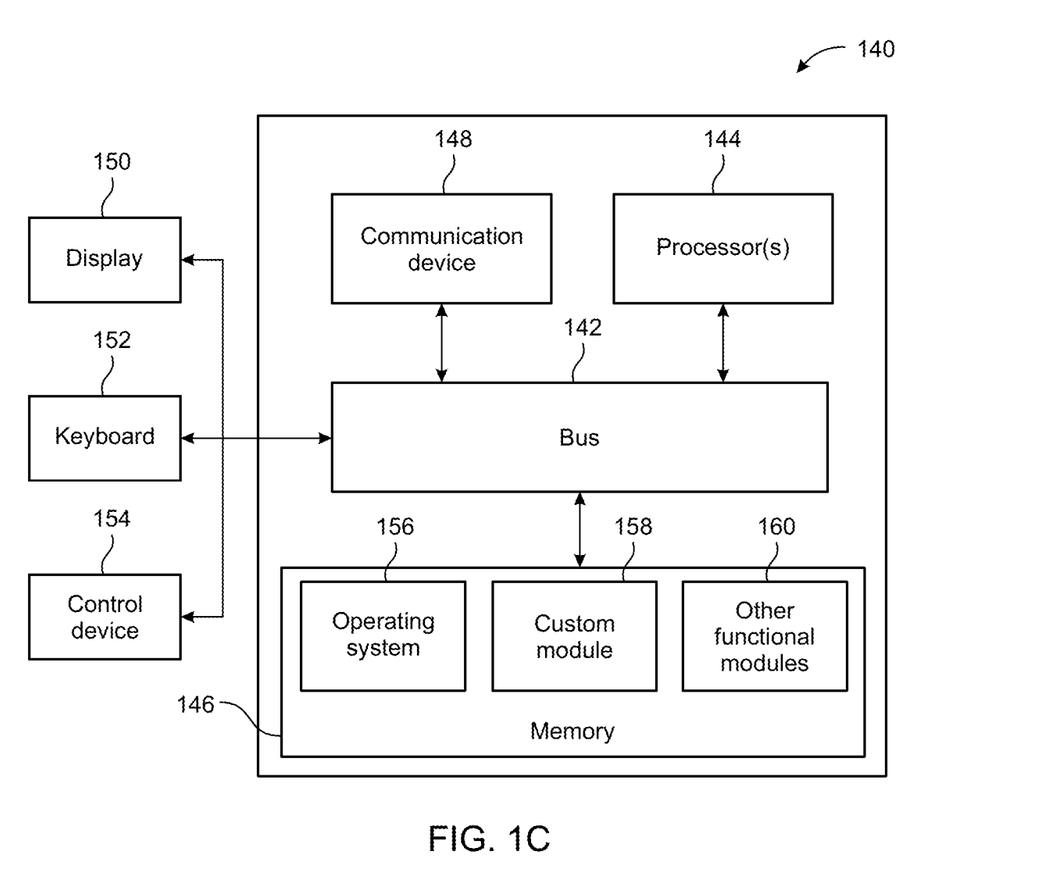
FIG. 1C is an illustration of a computing system or environment.

FIG. 10 is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a smartphone, a fixed mobile device, a smart display, a wearable computer, or the like.

Figure 2:
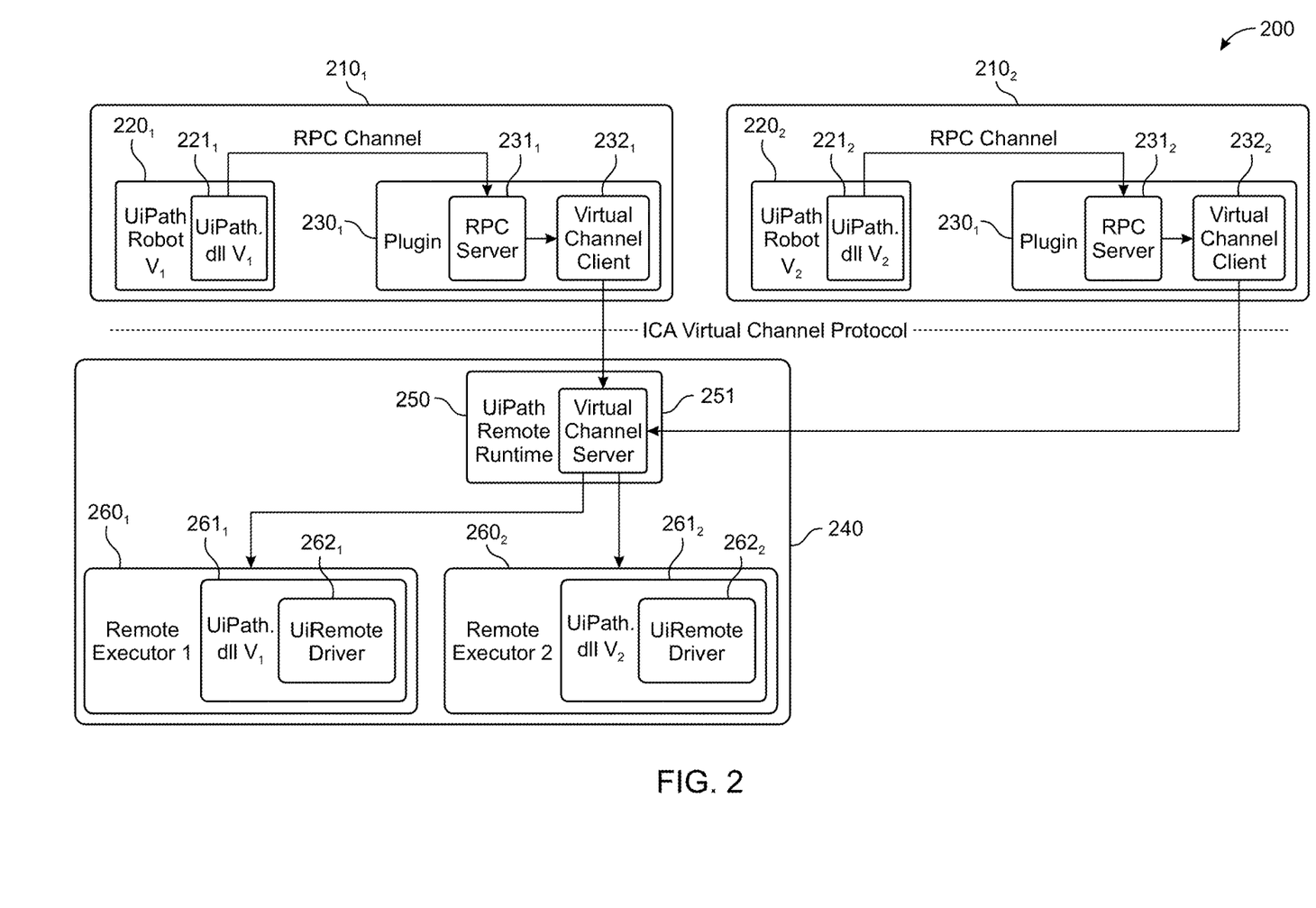
FIG. 2 is an example system diagram of a virtual machine environment in accordance with an example embodiment.

FIG. 2 is an example system diagram 200 of a virtual machine (VM) environment in accordance with an example embodiment. The system 200 includes one or more client devices, depicted as client devices $210_1$ and $210_2$, and an application server 240. Although two client devices 210 are shown, any number of client devices may be included in system 200. A robot v1 $220_1$ (e.g., UiPath Robot) that includes a dynamic link library (DLL) $221_1$ (e.g. UiPath.dll), and a plugin $220_1$ (e.g., a Citrix Plugin) that includes a remote procedure call (RPC) server $231_1$ and a virtual channel client $232_1$, are included in the client device $210_1$. The robot v1 $220_1$ communicates with the RPC server $231_1$ of the plugin $230_1$ via an RPC channel and the RPC server $231_1$ communicates with the virtual channel client $232_1$. Each client device 210 may be utilized for different applications to run in the VM environment. For example, client device $210_1$ may run accounting applications which require applications to be run with one version of drivers, while client device $210_2$ may be utilized for human resource applications and require applications to be run with a different version of drivers.

A robot v2 $220_2$ (e.g., UiPath Robot) that includes a DLL $221_2$ (e.g. UiPath.dll), and a plugin $220_2$ (e.g., a Citrix Plugin) that includes an RPC server $231_1$ and a virtual channel client $232_1$, are included in the client device $210_2$. The robot v2 $220_2$ communicates with the RPC server $231_2$ of the plugin $230_2$ via an RPC channel and the RPC server $231_2$ communicates with the virtual channel client $232_2$.

The application server 240 includes a remote runtime component 250 that includes a virtual channel server 251, a first remote executor $260_1$ (remote executor 1) and a second remote executor $260_2$ (remote executor 2). The virtual channel server 251 is in communication with both the first remote executor $260_1$ and the second remote executor $260_2$. The virtual channel clients $232_1$ and $232_2$ of robots $220_1$ and $220_2$, respectively, communicate with the virtual channel server 251 using an independent computing architecture (ICA) virtual channel protocol.

The first remote executor $260_1$ includes a DLL (UiPath.dll v1) $261_1$ and a UiRemote Driver $262_1$. The second remote executor $260_2$ includes a DLL (UiPath.dll v2) $261_2$ and a UiRemote Driver $262_2$. Although two remote executors (e.g., $260_1$ and $260_2$) are shown, any number of remote executors could be utilized.

Figure 3:
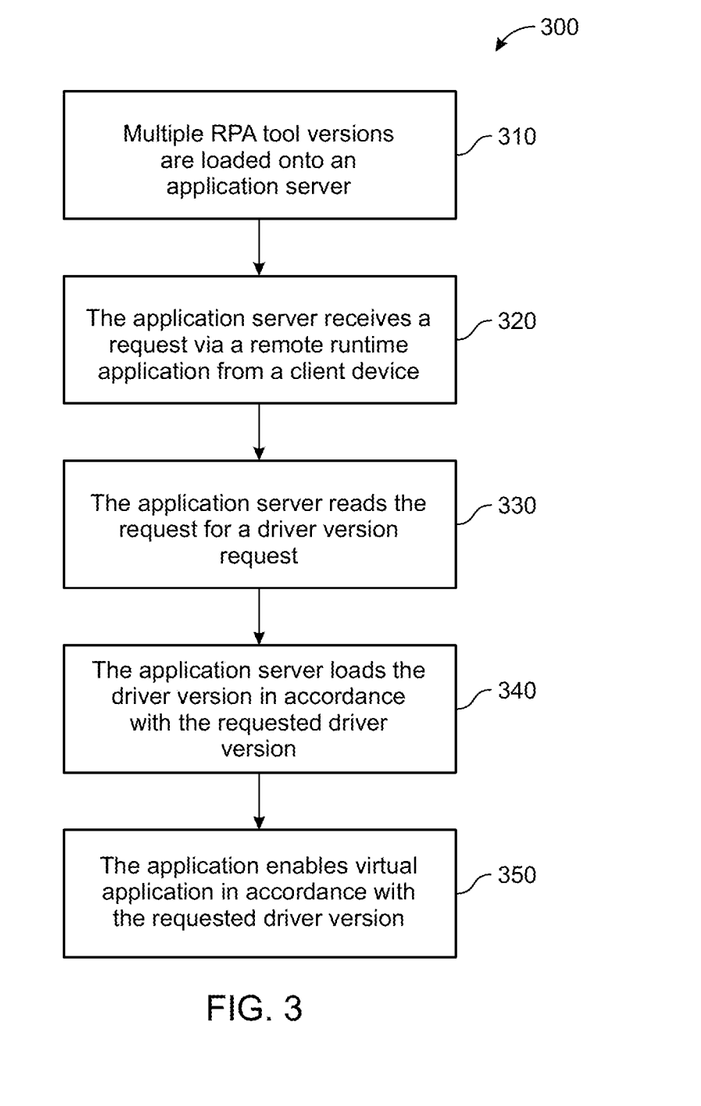
FIG. 3 is a flow diagram of an example method of performing remote native automation decoupling in accordance with an example embodiment.

FIG. 3 is a flow diagram of an example method 300 of performing remote native automation decoupling in accordance with an example embodiment. In step 310, multiple RPA tool versions are loaded onto an application server. For example, referring back to FIG. 2, first remote executor $260_1$ and second remote executor $260_2$ have driver versions 1 and 2 loaded, respectively. The application server then receives a request via a remote runtime application from a client device, (e.g., device $210_1$ or $210_2$) (step 220).

For example, referring again to FIG. 2, the remote runtime component 250 receives a request from the plugin $230_2$. The application server 240 reads the request for a driver version request (step 330). The application server 250 then loads the driver version in accordance with the requested driver version (step 340). In the present example, if the version request is for version 2, the remote runtime component 250 accesses the remote executor $260_2$ for the UiRemote Driver $262_2$. The application server 250 then enables virtual applications in accordance with the requested driver version (e.g., Version 2) (step 350).

It should be noted that the remote runtime component 250 may receive requests for different drivers in parallel with one another or serially. For example, in step 320, the remote runtime component 250 may receive both a request from plugin $230_1$ in parallel with the request from the plugin $230_2$. In that case, the remote runtime component 250 accesses the remote executor $260_1$ for the UiRemote Driver $261_1$ and enables virtual applications in accordance with version 1 for the request from client device $210_1$ and accesses the remote executor $260_2$ for the UiRemote Driver $262_2$ and enables virtual applications in accordance version 2 for the request from client device $210_2$.

In such a manner, the automation of virtualized applications is enabled by adding an extension (plugin) on the client machine and adding a Remote Runtime component on the application server which allows detecting UI elements, using selectors, for the virtual applications. Virtual channels like Independent Computing Architecture (ICA) protocol are used for communicating between a driver component in the server and the extension in the client to enable using selectors for the UI elements.

In order to support the automation tool with multiple driver versions, the multiple versions are installed on the application server and Remote Runtime is made to load multiple Driver DLLs. When the Remote Runtime receives a request with a specific driver version (the version is part of the request message), it loads that specific Driver version from the installed packages folder. Although the above description is related to operating in a native mode, it should be understood that the methods and apparatus above may be implemented in a non-native mode as well.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device for remote native decoupling in robotic process automation (RPA), comprising:
   a memory including a plurality of RPA tool driver versions; and
   a processor communicatively coupled with the memory, wherein upon the processor receiving a request for a first RPA tool driver version of the plurality of RPA tool driver versions, the processor loads the first RPA tool driver version for processing,
   wherein the processor receives a request for a second RPA tool driver version of the plurality of RPA tool driver versions and loads the second RPA tool driver version for processing, and
   wherein the request for the first RPA tool driver version and the request for the second RPA tool driver version are received in parallel.

2. The computing device of claim 1, wherein the request for the first RPA tool driver version is received from a first client device.

3. The computing device of claim 2, wherein the request for the second RPA tool driver version is received from a second client device.

4. The computing device of claim 1, wherein the processor further comprises a first remote executor that includes the first RPA tool driver version.

5. The computing device of claim 4, wherein the processor further comprises a second remote executor that includes a second RPA tool driver version.

6. The computing device of claim 5, wherein the processor utilizes the first remote executor to process the request for the first RPA tool driver version of the plurality of RPA tool driver versions.

7. The computing device of claim 5, wherein the processor utilizes the second remote executor to process the request for the second RPA tool driver version of the plurality of RPA tool driver versions.

8. A method for remote native decoupling in robotic process automation (RPA), the method comprising:
   receiving, by a processor, a request for a first RPA tool driver version of the plurality of RPA tool driver versions;
   loading, by the processor from a memory, the first RPA tool driver version for processing;
   providing a virtual application executing in accordance with the first RPA tool driver version; and
   receiving a request for a second RPA tool driver version of the plurality of RPA tool driver versions, and loading the second RPA tool driver version for processing, and
   wherein the request for the first RPA tool driver version and the request for the second RPA tool driver version are received in parallel.

9. The method of claim 8, wherein the request for the first RPA tool driver version is received from a first client device.

10. The method of claim 9, wherein the request for the second RPA tool driver version is received from a second client device.

11. The method of claim 8, wherein a first remote executor includes the first RPA tool driver version.

12. The method of claim 11, wherein a second remote executor includes the second RPA tool driver version.

13. The method of claim 12, further comprising executing by the first remote executor the request for the first RPA tool driver version of the plurality of RPA tool driver versions.

14. The method of claim 12, further comprising executing by the second remote executor the request for the second RPA tool driver version of the plurality of RPA tool driver versions.

15. A non-transitory computer-readable medium for remote native decoupling in robotic process automation (RPA), the non-transitory computer-readable medium having instructions recorded thereon, that when executed by a processor, cause the processor to perform operations including:
   receiving, by a processor, a request for a first RPA tool driver version of the plurality of RPA tool driver versions;
   loading, by the processor from a memory, the first RPA tool driver version for processing;
   providing a virtual application executing in accordance with the first RPA tool driver version; and
   receiving a request for a second RPA tool driver version of the plurality of RPA tool driver versions, and loading the second RPA tool driver version for processing, and wherein the request for the first RPA tool driver version and the request for the second RPA tool driver version are received in parallel.

* * * * *